(12) United States Patent
Dean (10) Patent No.: US 10,228,056 B2
(45) Date of Patent: Mar. 12, 2019

(54) SYSTEM, METHOD AND APPARATUS FOR SEAL MARKER

(71) Applicant: North American Pipe Corporation, Houston, TX (US)

(72) Inventor: Roy L. Dean, Schwenksville, PA (US)

(73) Assignee: North American Pipe Corporation, Houston, TX (US)

( * ) Notice: Subject to any disclaimer, the term of this patent is extended or adjusted under 35 U.S.C. 154(b) by 0 days.

(21) Appl. No.: 15/823,829

(22) Filed: Nov. 28, 2017

(65) Prior Publication Data

US 2018/0180183 A1 Jun. 28, 2018

Related U.S. Application Data

(60) Provisional application No. 62/437,735, filed on Dec. 22, 2016.

(51) Int. Cl.
| | | |
|---|---|---|
| *F16J 15/02* | (2006.01) | |
| *F16J 15/00* | (2006.01) | |
| *F16J 15/06* | (2006.01) | |
| *F16L 1/00* | (2006.01) | |

(52) U.S. Cl.
CPC .......... *F16J 15/022* (2013.01); *F16J 15/002* (2013.01); *F16J 15/025* (2013.01); *F16J 15/061* (2013.01); *F16J 15/062* (2013.01); *F16L 1/00* (2013.01)

(58) Field of Classification Search
CPC ........ F16J 15/022; F16J 15/002; F16J 15/061; F16J 15/062; F16J 15/025; F16L 5/02; F16L 5/10; F16L 7/02; F16L 3/142–3/143; F16L 21/02; F16L 1/00
USPC ......................................................... 277/609
See application file for complete search history.

(56) References Cited

U.S. PATENT DOCUMENTS

| | | | |
|---|---|---|---|
| 4,522,536 A | 6/1985 | Vidrine | |
| 4,909,520 A * | 3/1990 | Gallagher | ............ F16J 15/3204 |
| | | | 277/436 |
| 5,348,314 A * | 9/1994 | Antonini | .............. B26D 7/0006 |
| | | | 249/52 |
| 7,134,204 B2 * | 11/2006 | Corbett, Jr. | ......... F16L 37/0845 |
| | | | 29/890.14 |
| 7,527,306 B2 | 5/2009 | Ben-Horin | |
| 2012/0223521 A1 * | 9/2012 | Kotz | ................... F16L 19/0218 |
| | | | 285/335 |
| 2015/0151483 A1 | 6/2015 | Ewing et al. | |

FOREIGN PATENT DOCUMENTS

| | | |
|---|---|---|
| JP | 61133166 | 8/1986 |
| JP | 2000283295 A | 10/2000 |
| JP | 20072870 A | 1/2007 |
| JP | 2007002870 | * 1/2007 |

* cited by examiner

*Primary Examiner* — Nathan Cumar
(74) *Attorney, Agent, or Firm* — Lempia Summerfield Katz LLC (57) ABSTRACT

A seal has a seal body with an axis and axial-facing surfaces. The seal body is configured to be mounted to a tubular member, and seal between the tubular member and a second tubular member. A visual indicium can be located on only one of the axial-facing surfaces. Prior to assembly of the tubular member and the second tubular member, the visual indicium is configured to be visible to a user after being correctly mounted to the tubular member without the user physically contacting the seal body.

20 Claims, 5 Drawing Sheets

SYSTEM, METHOD AND APPARATUS FOR SEAL MARKER

This application claims priority to and the benefit of U.S. Prov. Pat. App. No. 62/437,735, filed on Dec. 22, 2016, which is incorporated herein by reference in its entirety.

BACKGROUND OF THE INVENTION

Field of the Disclosure

The present invention relates in general to pipes and, in particular, to a system, method and apparatus for a seal marker, such as for pipe assemblies.

Description of the Prior Art

Figure 5:
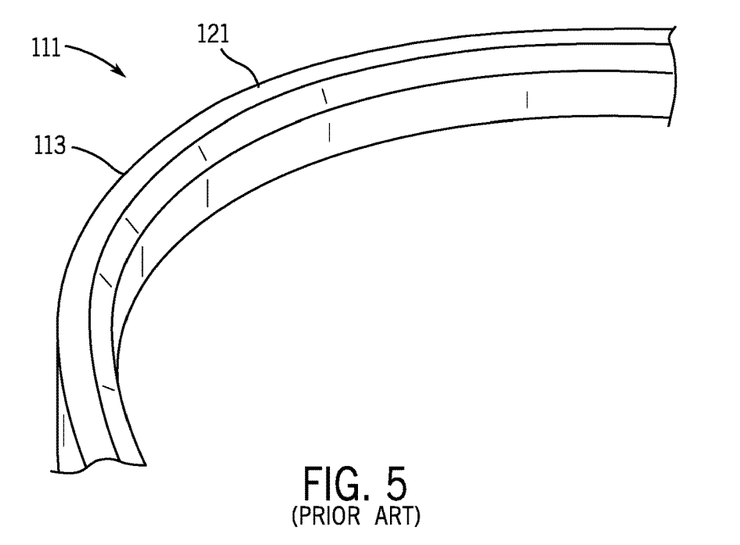
FIG. 5 is a photograph of a portion of a conventional seal.
Figure 6:
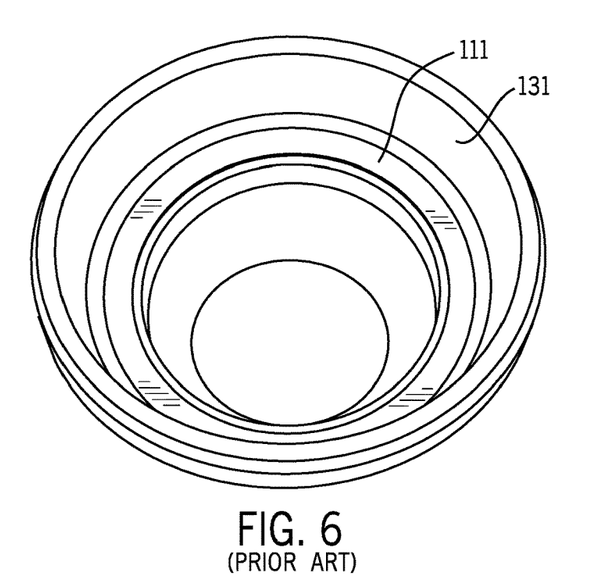
FIG. 6 is a photograph of the conventional seal of FIG. 5 installed in a tubular member.

Conventional seals for spline-type, restrained pipe joint systems typically can be installed facing in either axial direction. However, as seal designs become more sophisticated, some seals are unidirectional in their axial orientation when installed. Unfortunately, it is very difficult to tell if a seal has been installed in the correct axial direction once it is placed in a seal groove inside a coupling or belled pipe. For example, as shown in FIGS. 5 and 6, a conventional seal 111 includes a leading edge 113 having a marker 121. The marker 121 is located at the inner radial edge of the seal 111. When the seal 111 is installed in the seal groove of a coupling or pipe 131 (FIG. 6), the marker 121 is no longer visible and it is impossible to visually detect, from an exterior view of the pipe 131, whether the seal 111 was properly installed. Thus, to verify that the orientation of the seal 111 is correct, the person installing or inspecting the seal 111 is required to reach inside the pipe 131 and manually remove a portion of the seal 111 to verify whether it has been correctly installed. Thus, improvements in seals for pipe assemblies continue to be of interest.

SUMMARY

Embodiments of a system, method, assembly and apparatus for a seal with a seal marker are disclosed. For example, the seal can include a seal body having an axis and axial-facing surfaces. The seal body is configured to be mounted to a tubular member, and seal between the tubular member and a second tubular member. A visual indicium can be located on only one of the axial-facing surfaces. Prior to assembly of the tubular member and the second tubular member, the visual indicium is configured to be visible to a user after being correctly mounted to the tubular member without the user physically contacting the seal or seal body.

Another embodiment of a seal can include an axial-facing surface that also is an inner surface of the seal body. A visual indicium can be located on the axial-facing surface.

Alternatively, a seal can include an axial-facing surface with a visual indicium on the axial-facing surface. The visual indicium is axially spaced apart from the axial ends of a body of the seal.

Embodiments of a gasket for sealing between two polymeric tubular members can include a gasket body having an axis, an annular shape, and a generally triangular radial profile with respect to the axis having three seal surfaces. Each seal surface has a unique, non-symmetrical profile configured to engage and seal to a corresponding tubular member surface. At least one of the seal surfaces is configured to interact with a leading edge of an inserted pipe, and has a marker that is visible to an installer when the gasket is properly installed.

Embodiments of a tubular member, such as a pipe or coupling, or pipe system or pipe assembly can include a tubular body having an axis and a seal groove. The tubular body is configured to be mounted to a second tubular member. A seal is mounted in the seal groove and has axial-facing surfaces. The seal is configured to seal between the tubular member and the second tubular member. In addition, a visual indicium is located on only one of the axial-facing surfaces of the seal. Prior to assembly of the tubular member and the second tubular member, the visual indicium is configured to be visible to a user after being correctly mounted to the tubular member without the user physically contacting the seal body.

Embodiments of a method of installing a seal include providing a tubular member with an axis and a seal groove, and a seal having axial-facing surfaces and a visual indicium on only one of the axial-facing surfaces; mounting the seal in the seal groove, such that the visual indicium is visible in the installed position without physically contacting the seal; and then connecting a second tubular member to the tubular member such that the seal seals between the tubular member and the second tubular member.

Embodiments of a method of verifying proper installation of a seal include providing a tubular member with an axis and a seal groove, and a seal having axial-facing surfaces and a visual indicium on only one of the axial-facing surfaces; mounting the seal in the seal groove, such that the visual indicium is not visible; removing the seal from the seal groove, axially reorienting the seal, and re-installing the seal in the seal groove such that the visual indicium is visible without physically contacting the seal; and then connecting a second tubular member to the tubular member such that the seal seals between the tubular member and the second tubular member.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description can be had by reference to the embodiments thereof that are illustrated in the appended drawings. However, the drawings illustrate only some embodiments and therefore are not to be considered limiting in scope as there can be other equally effective embodiments.

DETAILED DESCRIPTION

Figure 1:
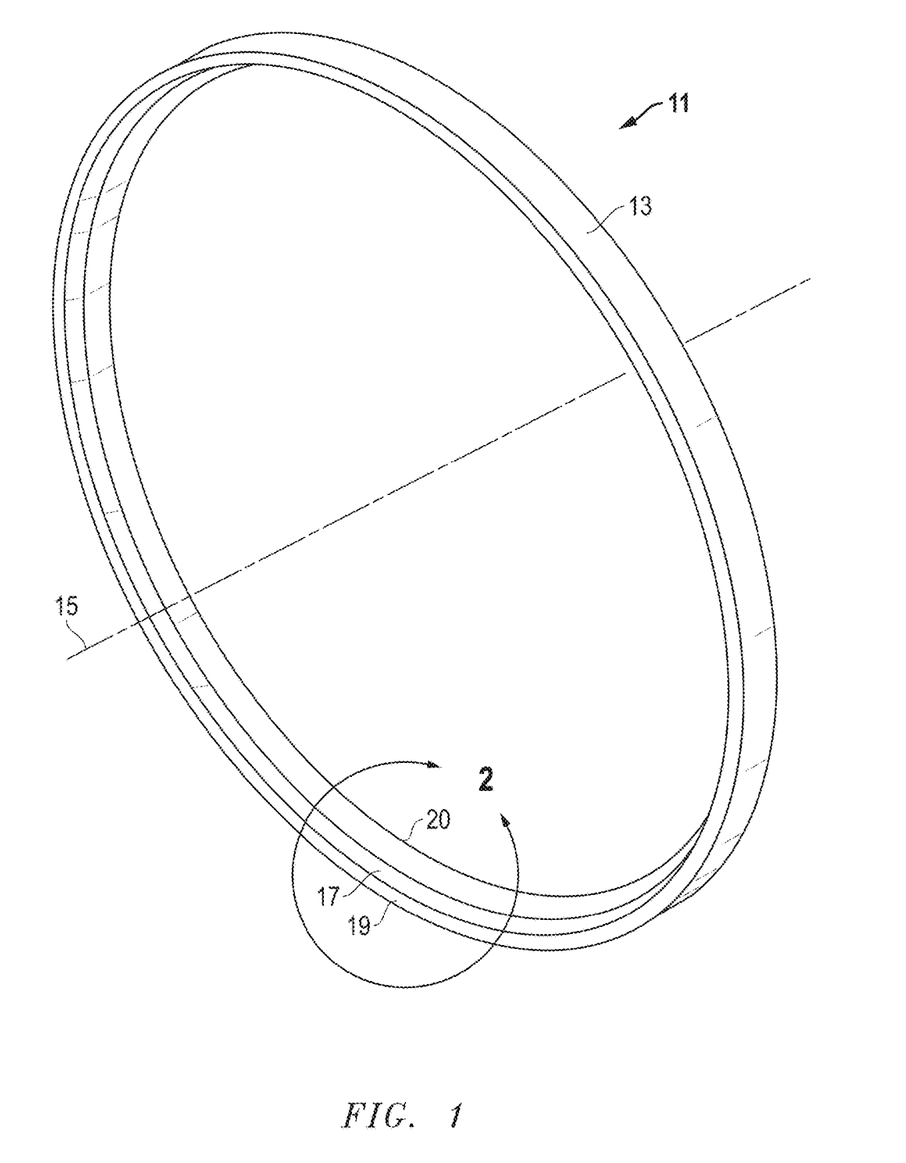
FIG. 1 is an isometric view of an embodiment of a seal.
Figure 2:
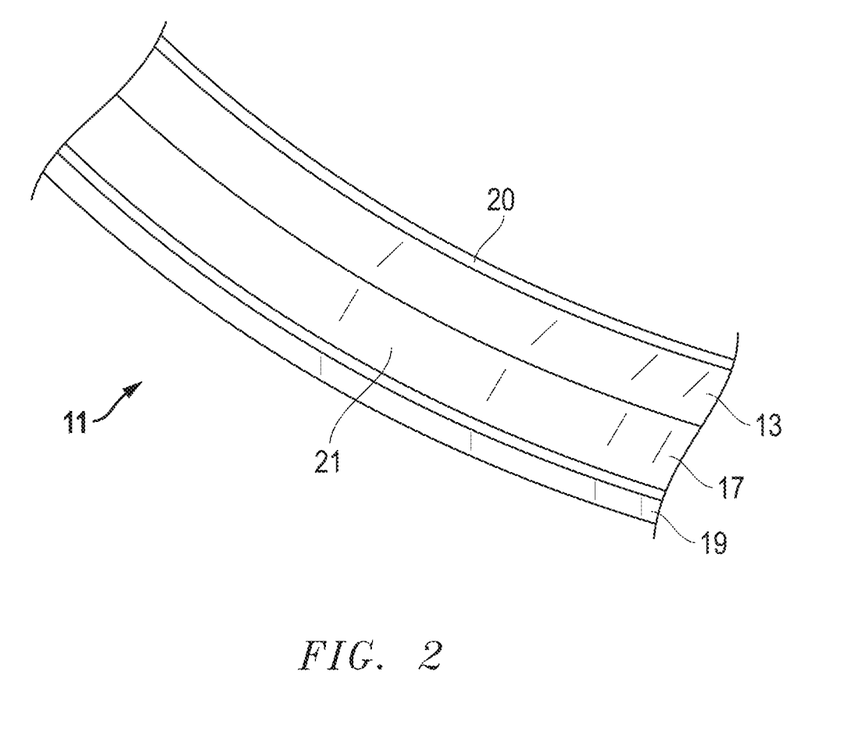
FIG. 2 is an enlarged isometric view of a portion of the seal of FIG. 1.

Embodiments of a system, method, assembly and apparatus for a seal are disclosed. For example, FIGS. 1 and 2 depict isometric and enlarged isometric views of an embodiment of a seal 11, such as a gasket. Seal 11 can include a seal body 13 having an axis 15 and one or more axial-facing surfaces 17, 19, 20. The seal body 13 is configured to be mounted to a tubular member, such as in the seal groove 33 of a pipe 31 (FIGS. 3 and 4) or a coupling. The seal 11 can be mounted to an interior or to an exterior of the tubular member. In addition, the seal body 13 is configured to seal between the tubular member and a second tubular member upon assembly thereof.

Embodiments of the seal 11 can include a visual indicium 21. In some examples, the visual indicium 21 is located on only one of the axial-facing surfaces 17, but not other ones of the axial-facing surfaces 19, 20. Said only one of the axial-facing surfaces 17 can be an inner surface of the seal body 13. In addition, the visual indicium 21 can be axially spaced apart from axial ends of the seal body 13, as shown.

Figure 7:
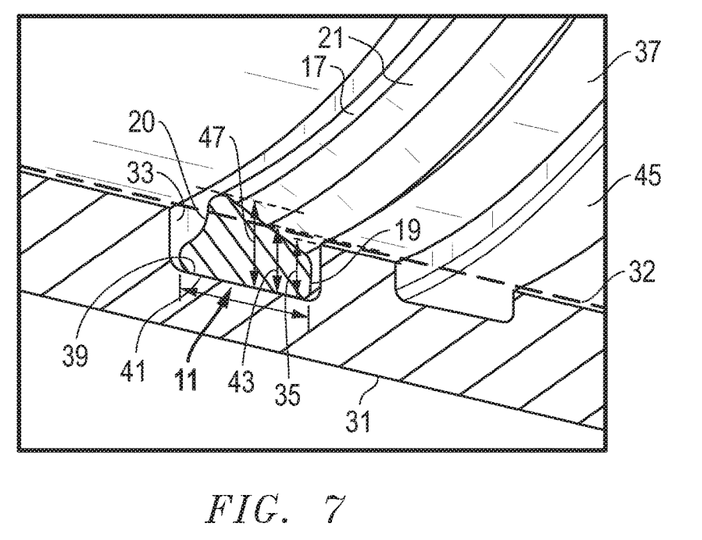
FIG. 7 is an enlarged, isometric, sectional view of another embodiment of a portion of the seal and pipe of FIG. 3.

In some embodiments, the tubular member (e.g., pipe 31) can be configured to have a seal groove 33 (FIG. 4) for the seal 11. The seal groove 33 has a seal groove radial depth 35 relative to the axis 15 defined between a diameter surface 37 of the tubular member and a radial surface 39 of the seal groove 33. The seal 11 has a seal groove surface 41 configured to radially abut the radial surface 39 of the seal groove 33. At least a portion of the visual indicium 21 is radially spaced apart from the seal groove surface 41 at a radial distance 43 that exceeds the seal groove radial depth 35. Pipe 31 also can comprise a spline groove 45 as is known in the art. In one version (FIG. 7), an entirety of the visual indicium 21 is radially spaced apart (e.g., inwardly) from the seal groove surface 41 at the radial distance 43 that exceeds the seal groove radial depth 35.

Figure 3:
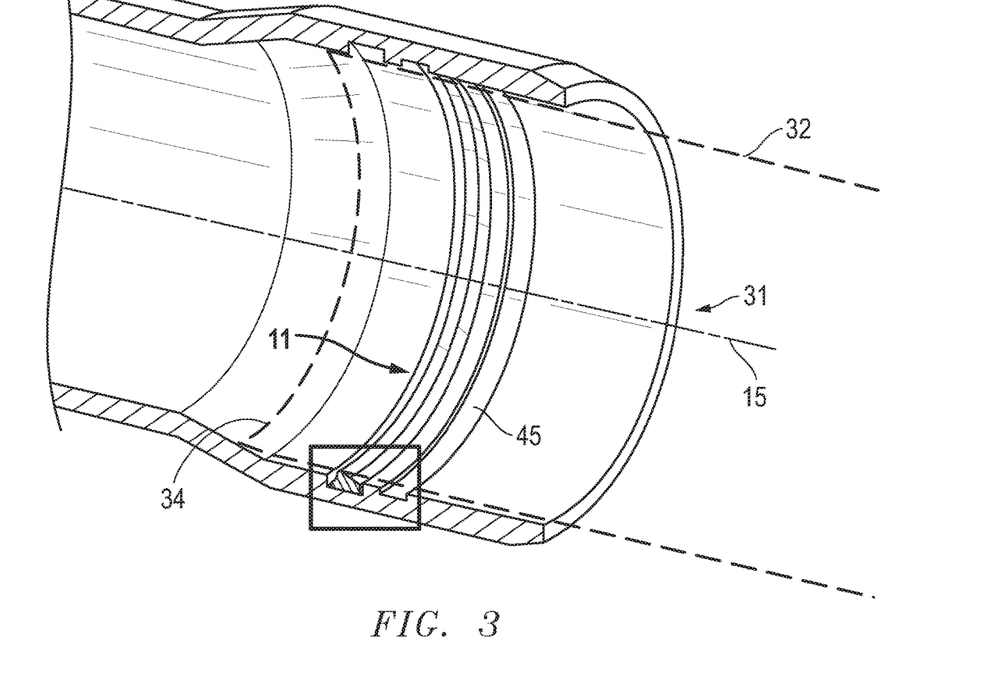
FIG. 3 is an isometric, sectional view of another embodiment of a seal mounted in a tubular member.
Figure 4:
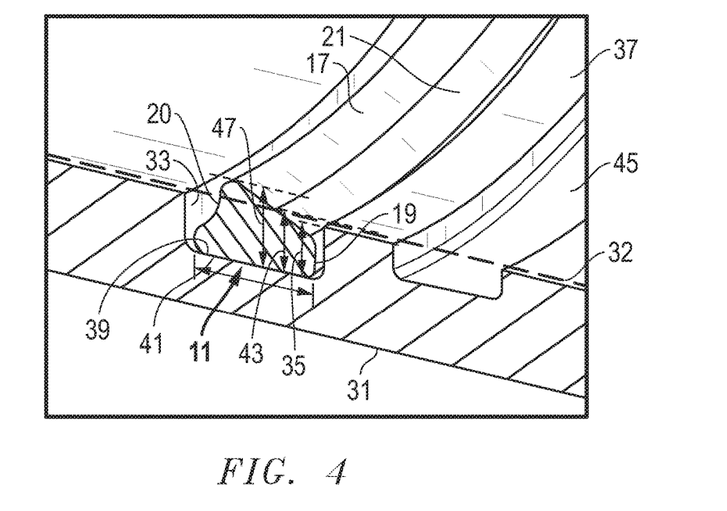
FIG. 4 is an enlarged, isometric, sectional view of a portion of the seal and pipe of FIG. 3.

A radial section of the seal body 13 can include a maximum radial dimension 47 with respect to the axis 15. Examples of the visual indicium 21 can be located in a radially outer half or two-thirds of the maximum radial dimension 47 of the radial section, relative to seal groove surface 41. As shown in FIGS. 3 and 4, the radial position of the visual indicium 21 also corresponds to an inner diameter portion of the seal 11, relative to axis 15. Thus, visual indicium 21 is radially located adjacent to the radial interior of seal 11, rather than the radial exterior of seal 21. The visual indicium 21 can be located in a radially inner half or two-thirds of the radial section of the seal 21, relative to the axis 15.

Prior to assembly of the tubular member (e.g., pipe 31) and the second tubular member, the visual indicium 21 can be configured to be visible to a user (e.g., looking right to left in FIG. 3, into the pipe 31) after being correctly mounted to the tubular member, without the user physically contacting the seal body 13.

Prior to assembly of the tubular member (e.g., pipe 31) and the second tubular member, the visual indicium 21 can be configured to be not visible to a user when incorrectly mounted to the tubular member without the user physically contacting the seal body 13 (e.g., by partially removing or twisting the seal 11). In addition, the visual indicium 21 is configured to be not visible after assembly of the tubular member and the second tubular member together (e.g., one pipe inserted into another).

After the seal body 13 is mounted to the tubular member, some embodiments of the visual indicium 21 can be configured to not be in contact with the tubular member. After assembly of the tubular member and the second tubular member, the visual indicium 21 can be configured to not be in contact with at least one of the tubular member or the second tubular member.

Embodiments of the visual indicium 21 can comprise a different color than the seal body 13. In an example, the only difference between the visual indicium 21 and the seal body 13 is the different color. Versions of the visual indicium 21 can comprise a first color (e.g., white) and the seal body 13 can comprise a darker color (e.g., black) than the first color. Examples of the visual indicium 21 can be painted on the seal body 13. In other examples, the seal body 13 can be extruded, and the visual indicium 21 can be painted on the seal body 13 while the seal body 13 is still hot from the extrusion process. Embodiments of the visual indicium 21 can comprise at least one of a roll stamp, a pictogram or printing on the seal body 13. Other versions of the visual indicium 21 are formed by at least one of insert molding, pad printing or screen printing on the seal body 13.

Some embodiments of the visual indicium 21 can comprise a stripe. One example of the stripe circumscribes an entirety of said only one of the axial-facing surfaces 17. Another example of the stripe comprises a dashed-line circle, or other non-continuous designs. The visual indicium 21 can have thickness that is substantially flush with said only one of the axial-facing surfaces 17. The visual indicium 21 can comprise a thickness that protrudes outward from said only one of the axial-facing surfaces 17. Examples of the visual indicium 21 can be configured to not be engraved or etched in the seal body 13. In addition, versions of the visual indicium 21 can be configured to not have a depth relative to the seal body 13. Examples of the visual indicium 21 can comprise less than about 50% of a surface area of said only one of the axial-facing surfaces 17.

Versions of the visual indicium 21 can include an axial orientation element configured to correctly axially orient the seal body 13 with respect to the tubular member. Examples of the visual indicium do not comprise a mechanical element configured to mechanically engage the tubular member. An embodiment of the visual indicium also is not a rotational alignment element configured to rotationally align the seal body 13 with the tubular member with respect to the axis 15. Other embodiments of the visual indicium 21 can include no protrusions that extend beyond a perimeter or interior of the seal body 13.

Again referring to FIG. 4, the seal 11 can comprise an axially uni-directional design. The seal 11 can include a radial sectional shape that is not circular. In some versions, the seal 11 has a radial sectional shape that is asymmetric. Examples of the seal 11 can comprise a gasket and not an o-ring. The seal body 13 can comprise an elastomer.

In still other embodiments, the seal 11 comprises a plurality of seals 11. Each seal 11 can comprise a different size. In addition, the visual indicium 21 can comprise a plurality of different visual indicia 21. Each different visual indicium 21 can be matched to a respective one of the different sized seals 11. In an example, the different visual indicia 21 comprise a different color for each different diameter of the seals 11.

Other embodiments comprise a seal 11 or gasket for sealing between two polymeric tubular members. The gasket can include a gasket or seal body 13 having an axis 15, an annular shape, and a generally triangular radial profile (see, e.g., FIG. 4) with respect to the axis Embodiments of the visual indicium 21 can comprise a different color than the seal body 13. In an example, an only difference between the visual indicium 21 and the seal body 13 is the different color. Versions of the visual indicium 21 can comprise a first color (e.g., white) and the seal body 13 can comprise a darker color (e.g., black) than the first color. Examples of the visual indicium 21 can be painted on the seal body 13. In other examples, the seal body 13 can be extruded, and the visual indicium can be painted on the seal body 13 while the seal body 13 is still hot from the extrusion process. Embodiments of the visual indicium 21 can comprise at least one of a roll stamp, a pictogram or printing. Other versions of the visual indicium 21 are formed by at least one of insert molding, pad printing or screen printing.

The seal body can comprise three seal surfaces. Each seal surface can include a unique, non-symmetrical profile configured to engage and seal to a corresponding tubular member surface. At least one of the seal surfaces 17 is configured to interact with a leading edge of an inserted pipe. In addition, said at least one of the seal surfaces 17 can include a marker that is visible to an installer when the gasket or seal 11 is properly installed.

Embodiments of a method of installing a seal also are disclosed. For example, the method can include providing a tubular member 31 with an axis 15 and a seal groove 33. In addition, a seal 11 having axial-facing surfaces 17, 19, 20, and a visual indicium 21 can be provided on only one of the axial-facing surfaces 17. The method can include mounting the seal 11 in the seal groove 33, such that the visual indicium 21 is visible without physically contacting the seal 11. The method can further include connecting a second tubular member to the tubular member 31 such that the seal 11 seals between the tubular member 31 and the second tubular member.

Embodiments of a method of verifying proper installation of a seal 11 can include providing a tubular member 31 with an axis 15 and a seal groove 33. A seal 11 having axial-facing surfaces 17, 19, 20 and a visual indicium 21 on only one of the axial-facing surfaces 17 also can be provided. The method can include mounting the seal 11 in the seal groove 33, such that the visual indicium 21 is not visible (e.g., it is incorrectly installed). The method can continue by removing the seal 11 from the seal groove 33, axially reorienting the seal 11, and re-installing the seal 11 in the seal groove 33 such that the visual indicium 21 is visible without physically contacting the seal 11. The method can conclude by connecting a second tubular member to the tubular member 31 such that the seal 11 seals between the tubular member 31 and the second tubular member.

The seals 11 or gaskets described herein can be made with an "extrude and splice" manufacturing technique. A manufacturer can extrude a long length of gasket material. The long length of gasket material can be cut into appropriate strips. The ends of each strip can then be bonded together to form a circular gasket. The seal marker 21 can be co-joined with the gasket material or later applied, such as with a paint marker that is on the extrusion line. In a version, the elastomer can be marked immediately as it leaves the extrusion die. Such a design allows the ink to bond to the still-hot elastomer. Alternatively, the seal marker 21 can be applied with a roll stamp type marker, dot matrix text, pictograms, or any other type of printing that could be visible on the surface of the gasket. When the gaskets are formed as a single continuous piece, the seal marker 21 can be formed with insert molding, pad printing, screen printing, etc.

Other versions can include one or more of the following embodiments:

Embodiment 1

A seal, comprising:
a seal body having an axis and axial-facing surfaces, the seal body is configured to be mounted to a tubular member, and the seal body is configured to seal between the tubular member and a second tubular member upon assembly thereof;
a visual indicium on only one of the axial-facing surfaces; and
prior to assembly of the tubular member and the second tubular member, the visual indicium is configured to be visible to a user after being correctly mounted to the tubular member without the user physically contacting the seal body.

Embodiment 2

The seal of any of these embodiments, wherein the tubular member is configured to have a seal groove for the seal body, the seal groove has a seal groove radial depth relative to the axis defined between a diameter surface of the tubular member and a radial surface of the seal groove, the seal body has a seal groove surface configured to radially abut the radial surface of the seal groove, and at least a portion of the visual indicium is radially spaced apart from the seal groove surface at a radial distance that exceeds the seal groove radial depth.

Embodiment 3

The seal of any of these embodiments, wherein an entirety of the visual indicium is radially spaced apart from the seal groove surface at the radial distance that exceeds the seal groove radial depth.

Embodiment 4

The seal of any of these embodiments, wherein, prior to assembly of the tubular member and the second tubular member, the visual indicium is configured to be not visible to a user when incorrectly mounted to the tubular member without the user physically contacting the seal body.

Embodiment 5

The seal of any of these embodiments, wherein the visual indicium is a different color than the seal body.

Embodiment 6

The seal of any of these embodiments, wherein an only difference between the visual indicium and the seal body is the different color.

Embodiment 7

The seal of any of these embodiments, wherein the visual indicium is a first color and the seal body is darker in color than the first color.

Embodiment 8

The seal of any of these embodiments, wherein the visual indicium is painted on the seal body.

Embodiment 9

The seal of any of these embodiments, wherein the seal body is extruded, and the visual indicium is painted on the seal body while the seal body is still hot from the extrusion process.

Embodiment 10

The seal of any of these embodiments, wherein the visual indicium comprises at least one of a roll stamp, a pictogram or printing.

Embodiment 11

The seal of any of these embodiments, wherein the visual indicium is formed by at least one of insert molding, pad printing or screen printing.

Embodiment 12

The seal of any of these embodiments, wherein the visual indicium comprises a thickness that is substantially flush with said only one of the axial-facing surfaces.

Embodiment 13

The seal of any of these embodiments, wherein the visual indicium comprises a thickness that protrudes outward from said only one of the axial-facing surfaces.

Embodiment 14

The seal of any of these embodiments, wherein the visual indicium is configured to not be engraved or etched in the seal body.

Embodiment 15

The seal of any of these embodiments, wherein the visual indicium is configured to not have a depth relative to the seal body.

Embodiment 16

The seal of any of these embodiments, wherein the visual indicium comprises an axial orientation element configured to correctly axially orient the seal body with respect to the tubular member.

Embodiment 17

The seal of any of these embodiments, wherein the visual indicium is not a mechanical element configured to mechanically engage the tubular member.

Embodiment 18

The seal of any of these embodiments, wherein the visual indicium is not a rotational alignment element configured to rotationally align the seal body with the tubular member with respect to the axis.

Embodiment 19

The seal of any of these embodiments, wherein the visual indicium is configured to be not visible after assembly of the tubular member and the second tubular member.

Embodiment 20

The seal of any of these embodiments, wherein the visual indicium comprises a stripe.

Embodiment 21

The seal of any of these embodiments, wherein the stripe circumscribes an entirety of said only one of the axial-facing surfaces.

Embodiment 22

The seal of any of these embodiments, wherein said only one of the axial-facing surfaces comprises an inner surface of the seal body.

Embodiment 23

The seal of any of these embodiments, wherein the visual indicium is axially spaced apart from axial ends of the seal body.

Embodiment 24

The seal of any of these embodiments, wherein, after the seal body is mounted to the tubular member, the visual indicium is configured to not be in contact with the tubular member.

Embodiment 25

The seal of any of these embodiments, wherein, after assembly of the tubular member and the second tubular member, the visual indicium is configured to not be in contact with at least one of the tubular member and the second tubular member.

Embodiment 26

The seal of any of these embodiments, wherein the seal is axially uni-directional.

Embodiment 27

The seal of any of these embodiments, wherein the seal has a radial sectional shape that is not circular.

Embodiment 28

The seal of any of these embodiments, wherein the seal has a radial sectional shape that is asymmetric.

Embodiment 29

The seal of any of these embodiments, wherein the seal is a gasket and is not an o-ring.

Embodiment 30

The seal of any of these embodiments, wherein the seal body comprises an elastomer.

Embodiment 31

The seal of any of these embodiments, wherein the visual indicium comprises no protrusions that extend beyond a perimeter of the seal body.

Embodiment 32

The seal of any of these embodiments, wherein the tubular member is a pipe or a coupling.

Embodiment 33

The seal of any of these embodiments, wherein the seal body is configured to be mounted to an interior of the tubular member.

Embodiment 34

The seal of any of these embodiments, wherein the seal body is configured to be mounted to an exterior of the tubular member.

Embodiment 35

The seal of any of these embodiments, wherein the visual indicium comprises less than about 50% of a surface area of said only one of the axial-facing surfaces.

Embodiment 36

The seal of any of these embodiments, wherein a radial section of the seal body comprises a maximum radial dimension with respect to the axis, and the visual indicium is located in a radially inner half or two-thirds of the radial section, relative to the axis.

Embodiment 37

The seal of any of these embodiments, wherein the seal comprises a plurality of seals, each having a different size, and the visual indicium comprises a different visual indicium for each of the different sized seals.

Embodiment 38

The seal of any of these embodiments, wherein the different visual indicia comprise a different color for each different seal diameter.

Embodiment 39

A seal, comprising:
a seal body having an axis and an axial-facing surface that also is an inner surface of the seal body, the seal body is configured to be mounted to a tubular member, and the seal body is configured to seal between the tubular member and a second tubular member upon assembly thereof; and
a visual indicium on the axial-facing surface.

Embodiment 40

The seal of any of these embodiments, wherein, prior to assembly of the tubular member and the second tubular member, the visual indicium is configured to be visible to a user after being correctly mounted to the tubular member without the user physically contacting the seal body.

Embodiment 41

A seal, comprising:
a seal body having an axis, axial ends and an axial-facing surface, the seal body is configured to be mounted to a tubular member, and the seal body is configured to seal between the tubular member and a second tubular member upon assembly thereof; and
a visual indicium on the axial-facing surface, and the visual indicium is axially spaced apart from the axial ends of the seal body.

Embodiment 42

The seal of any of these embodiments, wherein, prior to assembly of the tubular member and the second tubular member, the visual indicium is configured to be visible to a user after being correctly mounted to the tubular member without the user physically contacting the seal body.

Embodiment 43

A gasket for sealing between two polymeric tubular members, the gasket comprising:
a gasket body having an axis, an annular shape, and a generally triangular radial profile with respect to the axis, comprising three seal surfaces, each seal surface having a unique, non-symmetrical profile configured to engage and seal to a corresponding tubular member surface, wherein at least one of the seal surfaces is configured to interact with a leading edge of an inserted pipe; and
said at least one of the seal surfaces comprises a marker that is visible to an installer when the gasket is properly installed, and the marker is not visible to the installer when the gasket is installed backwards (i.e., axially backwards relative to the two polymeric tubular members) without the installer physically contacting the gasket.

Embodiment 44

A tubular member, comprising:
a tubular body having an axis and a seal groove, the tubular body being configured to be mounted to a second tubular member;
a seal mounted in the seal groove, the seal having axial-facing surfaces, and the seal is configured to seal between the tubular member and the second tubular member upon assembly thereof;
a visual indicium on only one of the axial-facing surfaces of the seal; and
prior to assembly of the tubular member and the second tubular member, the visual indicium is configured to be visible to a user after being correctly mounted to the tubular member without the user physically contacting the seal body.

Embodiment 45

The tubular member of any of these embodiments, wherein said only one of the axial-facing surfaces comprises an inner surface of the seal.

Embodiment 46

The tubular member of any of these embodiments, wherein the visual indicium is axially spaced apart from axial ends of the seal.

Embodiment 47

The tubular member of any of these embodiments, wherein the tubular body comprises a pipe with a belled end or a coupling, and the seal groove and seal are in an interior thereof.

Embodiment 48

A pipe system, comprising:
a first tubular member and a second tubular member, each having an axis and configured to be connected to each other, and one of the first and second tubular members comprises a seal groove in an interior thereof;
a seal mounted in the seal groove, the seal having axial-facing surfaces, and the seal is configured to seal between the first and second tubular members upon assembly thereof;
a visual indicium on only one of the axial-facing surfaces of the seal; and
prior to assembly of the first and second tubular members, the visual indicium is configured to be visible to a user when correctly mounted in the seal groove without the user physically contacting the seal.

Embodiment 49

The pipe system of any of these embodiments, wherein said only one of the axial-facing surfaces comprises an inner surface of the seal.

Embodiment 50

The pipe system of any of these embodiments, wherein the visual indicium is axially spaced apart from axial ends of the seal.

Embodiment 51

The pipe system of any of these embodiments, wherein each of the first and second tubular members comprises a pipe with a belled end and a spigot end, and a respective seal groove in respective ones of the belled ends.

Embodiment 52

The pipe system of any of these embodiments, wherein the first tubular member comprises a pipe, the second tubular member comprises a coupling, and further comprising a second pipe configured to be connected to the coupling opposite the pipe.

Embodiment 53

A pipe assembly, comprising:
a first tubular member and a second tubular member, each having an axis and connected to each other, and one of the first and second tubular members comprises a seal groove in an interior thereof;
a seal mounted in the seal groove, the seal having axial-facing surfaces, and the seal seals between the first and second tubular members;
a visual indicium on only one of the axial-facing surfaces of the seal such that, prior to assembly of the first and second tubular members, the visual indicium is visible to a user when correctly mounted in the seal groove without the user physically contacting the seal.

Embodiment 54

The pipe assembly of any of these embodiments, wherein said only one of the axial-facing surfaces comprises an inner surface of the seal.

Embodiment 55

The pipe assembly of any of these embodiments, wherein the visual indicium is axially spaced apart from axial ends of the seal.

Embodiment 56

The pipe assembly of any of these embodiments, wherein each of the first and second tubular members comprises a pipe with a belled end and a spigot end, and a respective seal groove in respective ones of the belled ends.

Embodiment 57

The pipe assembly of any of these embodiments, wherein the first tubular member comprises a pipe, the second tubular member comprises a coupling, and further comprising a second pipe configured to be connected to the coupling opposite the pipe.

Embodiment 58

A method of installing a seal, the method comprising:
(a) providing a tubular member with an axis and a seal groove, and a seal having axial-facing surfaces and a visual indicium on only one of the axial-facing surfaces;
(b) mounting the seal in the seal groove, such that the visual indicium is visible without physically contacting the seal; and then
(c) connecting a second tubular member to the tubular member such that the seal seals between the tubular member and the second tubular member.

Embodiment 59

A method of verifying proper installation of a seal, the method comprising:
(a) providing a tubular member with an axis and a seal groove, and a seal having axial-facing surfaces and a visual indicium on only one of the axial-facing surfaces;
(b) mounting the seal in the seal groove, such that the visual indicium is not visible;
(c) removing the seal from the seal groove, axially reorienting the seal, and re-installing the seal in the seal groove such that the visual indicium is visible without physically contacting the seal; and then
(d) connecting a second tubular member to the tubular member such that the seal seals between the tubular member and the second tubular member.

Embodiment 60

The seal of any of these embodiments, wherein the different color of the visual indicium is varied to identify at least one of specific seal material or classification information.

Embodiment 61

The seal of any of these embodiments, wherein the seal body is generally triangular in radial section relative to the axis, and the visual indicium is located on a hypotenuse face of the seal body.

Embodiment 62

The seal of any of these embodiments, wherein the visual indicium is not visible to the user when the seal is installed axially backwards in the tubular member without the user physically contacting the seal.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity can not be required, and that one or more further activities can be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B or C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any subcombination. Further, references to values stated in ranges include each and every value within that range.

What is claimed is:

1. A seal, comprising:
 a seal body that is annular and has an axis and axial-facing surfaces, the seal body is configured to be mounted in a radial seal groove of a tubular member having an axial bore, the radial seal groove is formed in a radial surface of the axial bore, the seal body extends radially from the radial seal groove beyond the axial bore, and the seal body is configured to seal between the radial seal groove of the tubular member and an outer radial surface of a second tubular member upon assembly thereof;
 a visual indicium on only one of the axial-facing surfaces of the seal body, the visual indicium circumscribes an entirety of the only one of the axial-facing surfaces relative to the axis; and
 prior to assembly of the tubular member and the second tubular member, the visual indicium is visible to a user when the seal body is mounted in the radial seal groove of the tubular member in a first axial direction without the user physically contacting the seal body and, also prior to assembly of the tubular member and the second tubular member, the visual indicium is configured to be not visible to a user when the seal body is mounted in the radial seal groove of the tubular member in a second axial direction opposite to the first axial direction without the user physically contacting the seal body,
 wherein the seal body is generally triangular in radial section relative to the axis, and the visual indicium is located only on a hypotenuse face of the seal body.

2. The seal of claim 1, wherein the radial seal groove has a seal groove radial depth relative to the axis defined between the bore of the tubular member and a seal groove radial surface of the radial seal groove, and an entirety of the visual indicium is radially spaced apart from the seal groove radial surface at a radial distance that exceeds the seal groove radial depth.

3. The seal of claim 1, wherein the visual indicium is a different color than the seal body.

4. The seal of claim 3, wherein the different color of the visual indicium is varied to identify at least one of specific seal material or classification information.

5. The seal of claim 1, wherein the seal body is extruded, and the visual indicium is painted on the seal body while the seal body is still hot from the extrusion process.

6. The seal of claim 1, wherein the visual indicium comprises at least one of a roll stamp, a pictogram or printing.

7. The seal of claim 1, wherein the visual indicium comprises a thickness that is substantially flush with the only one of the axial-facing surfaces.

8. The seal of claim 1, wherein the visual indicium comprises a thickness that protrudes outward from the only one of the axial-facing surfaces.

9. The seal of claim 1, wherein the visual indicium is configured to not have a depth relative to the seal body.

10. The seal of claim 1, wherein the visual indicium comprises an axial orientation element configured to correctly axially orient the seal body with respect to the tubular member.

11. The seal of claim 1, wherein the visual indicium is not a mechanical element configured to mechanically engage the tubular member.

12. The seal of claim 1, wherein the visual indicium is not a rotational alignment element configured to rotationally align the seal body with the tubular member with respect to the axis; and the visual indicium is configured to be not visible after assembly of the tubular member and the second tubular member.

13. The seal of claim 1, wherein the only one of the axial-facing surfaces comprises an inner surface of the seal body.

14. The seal of claim 1, wherein the visual indicium is axially spaced apart from axial ends of the seal body.

15. The seal of claim 1, wherein, after the seal body is mounted to the tubular member, the visual indicium is configured to not be in contact with the tubular member.

16. The seal of claim 1, wherein, after assembly of the tubular member and the second tubular member, the visual indicium is configured to not be in contact with at least one of the tubular member or the second tubular member.

17. The seal of claim 1, wherein the seal is axially uni-directional.

18. The seal of claim 1, wherein the visual indicium comprises no protrusions that extend beyond a perimeter of the seal body.

19. The seal of claim 1, wherein the visual indicium comprises less than about 50% of a surface area of the only one of the axial-facing surfaces.

20. The seal of claim 1, wherein a radial section of the seal body comprises a maximum radial dimension with respect to the axis, and the visual indicium is located in a radially inner two-thirds of the radial section, relative to the axis.

* * * * *